United States Patent
Takahashi

(10) Patent No.: US 8,144,965 B2
(45) Date of Patent: Mar. 27, 2012

(54) IMAGE PROCESSING APPARATUS, IMAGE PROCESSING METHOD, AND COMPUTER STORAGE MEDIUM

(75) Inventor: Naoto Takahashi, Kunitachi (JP)

(73) Assignee: Canon Kabushiki Kaisha, Tokyo (JP)

( * ) Notice: Subject to any disclaimer, the term of this patent is extended or adjusted under 35 U.S.C. 154(b) by 804 days.

(21) Appl. No.: 12/270,067

(22) Filed: Nov. 13, 2008

(65) Prior Publication Data

US 2009/0129658 A1    May 21, 2009

(30) Foreign Application Priority Data

Nov. 15, 2007  (JP) ................. 2007-296846

(51) Int. Cl.
*G06K 9/00* (2006.01)
(52) U.S. Cl. ....................................... 382/132
(58) Field of Classification Search .................. 382/128, 382/132
See application file for complete search history.

(56) References Cited

FOREIGN PATENT DOCUMENTS

| JP | 61-245281 | 10/1986 |
|---|---|---|
| JP | 3-022968 | 3/1991 |

OTHER PUBLICATIONS

A Threshold Selection Method from Gray-Level Histograms (N. Otsu, IEEE Transactions on Systems, Man, and Cybernetics, vol. 9, No. 1, pp. 62-66, 1979).

*Primary Examiner* — Jurie Yun
(74) *Attorney, Agent, or Firm* — Canon U.S.A., Inc., IP Division

(57) ABSTRACT

A feature value corresponding to each of a plurality of pixel values is calculated for an image. A pixel value is selected for which a minimum distance is obtained in a feature space between the calculated feature value and a feature value of a template. The selected pixel value is employed as a threshold value at which a subject area and a background area in the image are separated from each other.

8 Claims, 6 Drawing Sheets

IMAGE PROCESSING APPARATUS, IMAGE PROCESSING METHOD, AND COMPUTER STORAGE MEDIUM

BACKGROUND OF THE INVENTION

1. Field of the Invention

The present invention relates to a technique of discriminating a subject area of a radiation image from a background area exposed directly to radiation.

2. Description of the Related Art

In medical applications, digital image processing apparatuses capable of outputting digital radiation image data are becoming popular. In digital image processing apparatuses, techniques of image processing are essentially important. Of various image processing techniques for radiation image data, a gray-level conversion process is of particular importance to convert radiation image data so as to have proper pixel levels (brightness) and proper contrast that allow diagnosis to be easily performed.

In diagnosis using radiation image data, an entire image is not always necessary. On the contrary, in many cases, information is necessary as to a part of an image. Therefore, an unnecessary area is generally deleted from a total image, and a gray-level conversion curve is determined based on a statistical characteristic of the remaining necessary area of the image.

More specifically, for example, a subject area is extracted as shown in FIG. 6 so as not to include a background area (also called a directly-exposed area) in which a radiation directly reaches a sensor without passing though a subject, and the gray-level conversion curve is determined such that the range from a minimum value to a maximum value of the subject area falls within the range from a minimum density 0.2 D to a maximum density 3.2 D.

It is troublesome for a user to define a threshold value by which to discriminate between a subject area and a background area. To avoid this problem, many methods of automatically determining the threshold value are known. For example, in a method disclosed in "A Threshold Selection Method from Gray-Level Histograms" (N. Otsu, IEEE Transactions on Systems, Man, and Cybernetics, Vol. 9, No. 1, pp. 62-66, 1979), an image is divided into two classes, and the interclass variance is calculated. When the interclass variance has a maximum value for a particular pixel value, this pixel value is determined as the threshold value by which to separate the subject area and background area from each other.

In a method disclosed in Japanese Patent Publication No. 03-022968, a frequency threshold value is determined depending on an image-captured part of a body from a histogram of an entire image, and a minimum value and a maximum value of a particular image area of interest are determined based on the frequency threshold value.

In a method disclosed in Japanese Patent Laid-Open No. 61-245281, an entire image is divided into a regular mesh and the variance of pixel values is calculated for each element of the mesh. Mesh elements having a variance smaller than a properly determined threshold value are determined to be in a background area.

In the above-described method disclosed in Japanese Patent Publication No. 03-022968, the background area is detected by comparing the variances of the respective mesh elements with the properly determined threshold value. However, a specific method of determining the threshold value is not disclosed in Japanese Patent Publication No. 03-022968. In a case where a subject area has a pixel value variance with a small value similar to that of a background area, there is a possibility that the subject area is incorrectly recognized as a background area. Thus, this technique has a problem that high-accuracy detection of a background area is difficult.

SUMMARY OF THE INVENTION

In view of the above, the present invention provides an image processing apparatus, an image processing method, and a computer storage medium, configured to discriminate a subject area of a radiation image from a background area directly exposed to a radiation.

The present invention provides an image processing apparatus configured to obtain a pixel value indicating a value of a boundary between a subject area and a background area of an image, the subject area being an area formed by a radiation passing through a subject, the background area being an area directly exposed to the radiation, the image processing apparatus including a storage unit configured to obtain, from the image, a feature value corresponding to the pixel value indicating the boundary between the subject area and the background area directly exposed to the radiation and store the obtained feature value as a template, a calculation unit configured to calculate a feature value corresponding to each of a plurality of pixel values from the image, a distance calculation unit configured to calculate a distance in a feature space between the feature value of the template and each of the feature values calculated by the calculation unit, and a selection unit configured to select a pixel value corresponding to a feature value with a smallest distance calculated by the distance calculation unit, the selected pixel value indicating the boundary between the subject area and the background area in the image.

Other features of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention, and together with the description, serve to explain the principles of the invention.

DESCRIPTION OF THE EMBODIMENTS

The present invention is described in further detail below with reference to exemplary embodiments in conjunction with the accompanying drawings.

First Exemplary Embodiment

Figure 1:
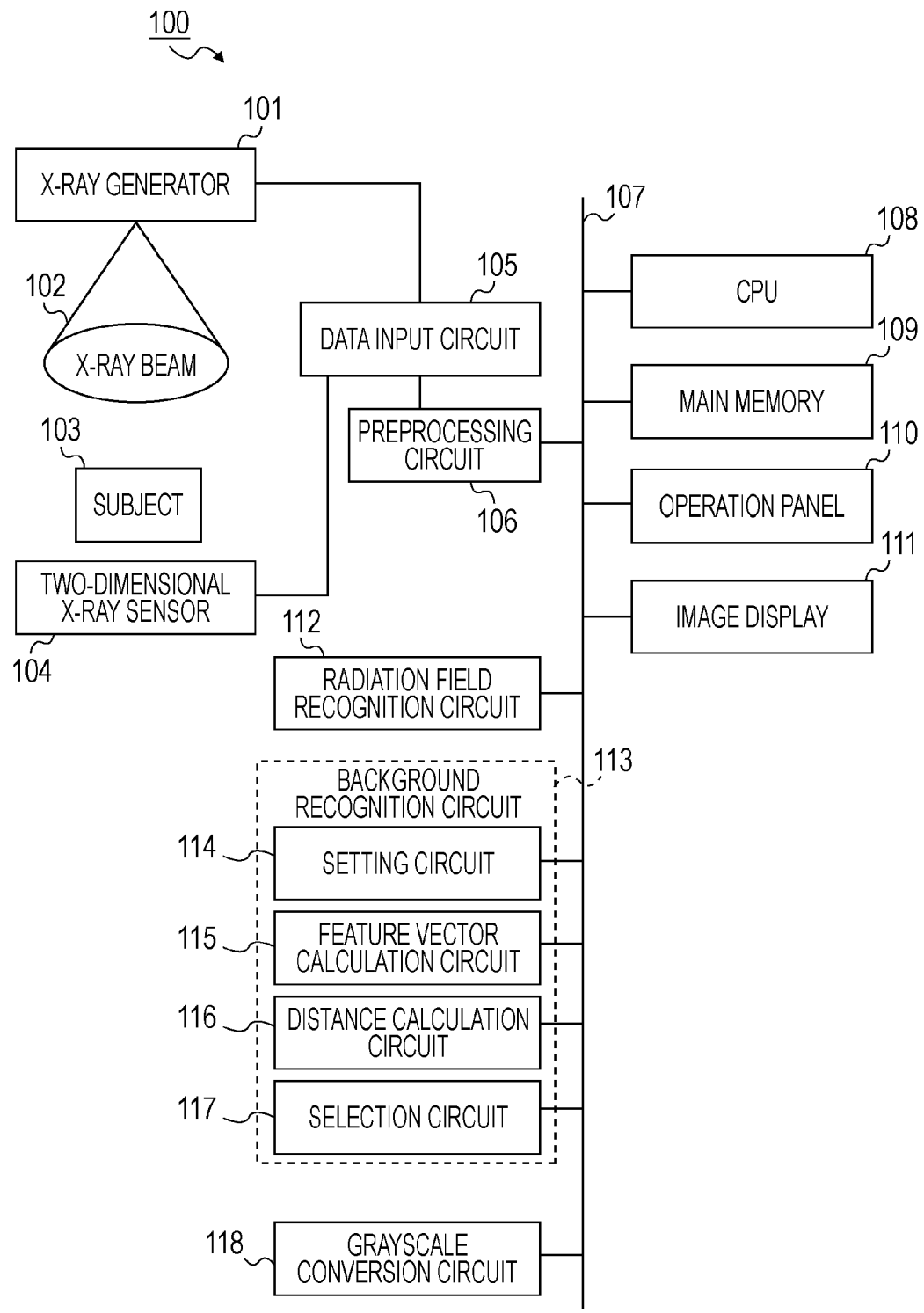
FIG. 1 is a diagram illustrating a configuration of an image processing apparatus according to an embodiment of the present invention.
Figure 2:
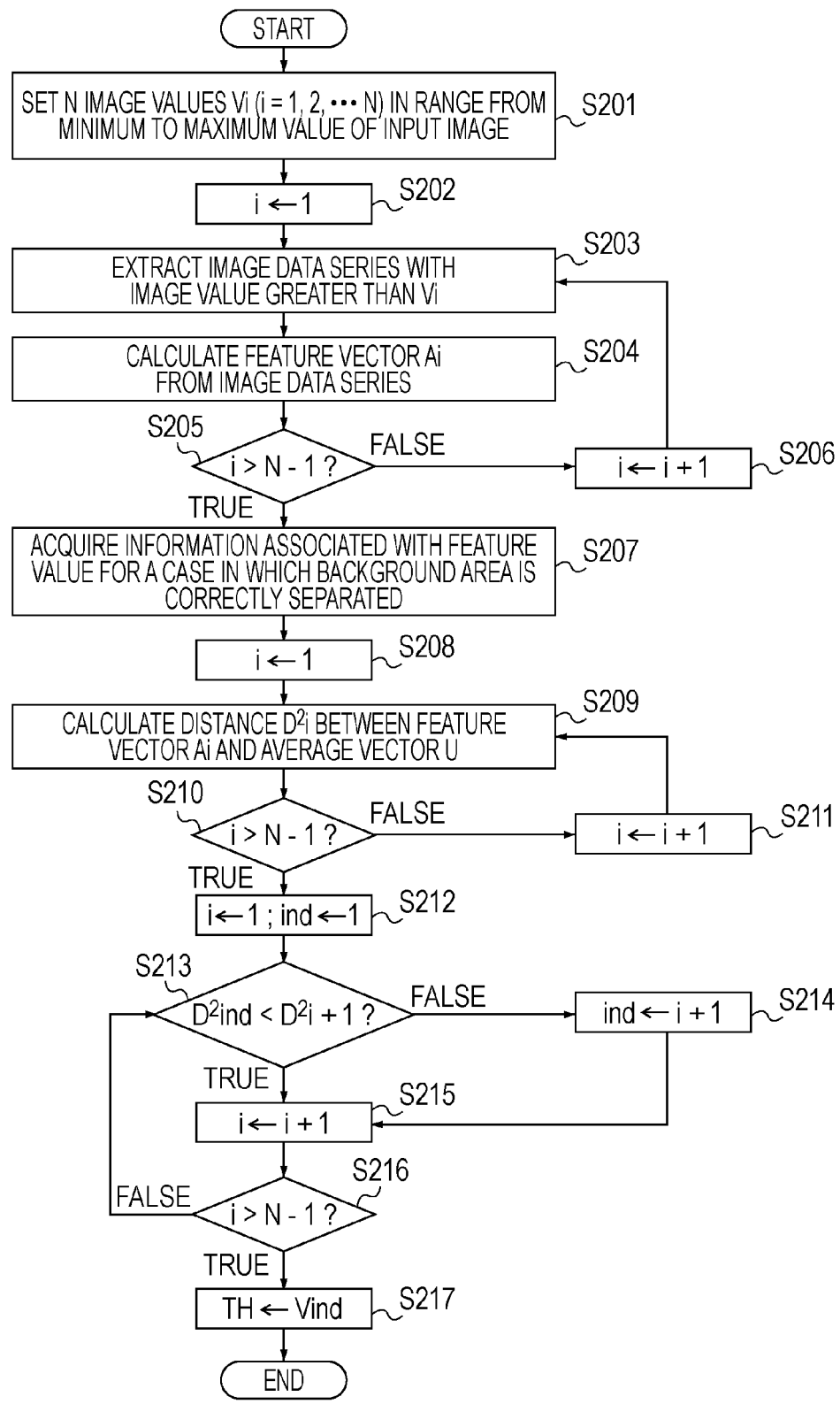
FIG. 2 is a flow chart illustrating a process performed by a background recognition circuit according to an embodiment of the present invention.

FIG. 1 is a diagram illustrating an image processing apparatus configured to have functions according to an exemplary embodiment of the present invention. FIG. 2 is a flow chart illustrating a process performed by a background recognition circuit according to the present embodiment of the invention.

Referring to FIGS. 1 and 2, the present embodiment is described below.

First, referring to FIG. 1, the configuration of the image processing apparatus 100 according to the present embodiment is described below. As shown in FIG. 1, the image processing apparatus 100 has a capability of effectively performing image processing when an image is output on a film or a monitor.

The image processing apparatus 100 includes a data input circuit 105, a preprocessing circuit 106, a CPU 108, a main memory 109, an operation panel 110, an image display 111, a radiation field recognition circuit 112, a background recognition circuit 113, and a grayscale conversion circuit 118. These parts are connected to each other via a CPU bus 107 such they can communicate with each other.

Figure 3:
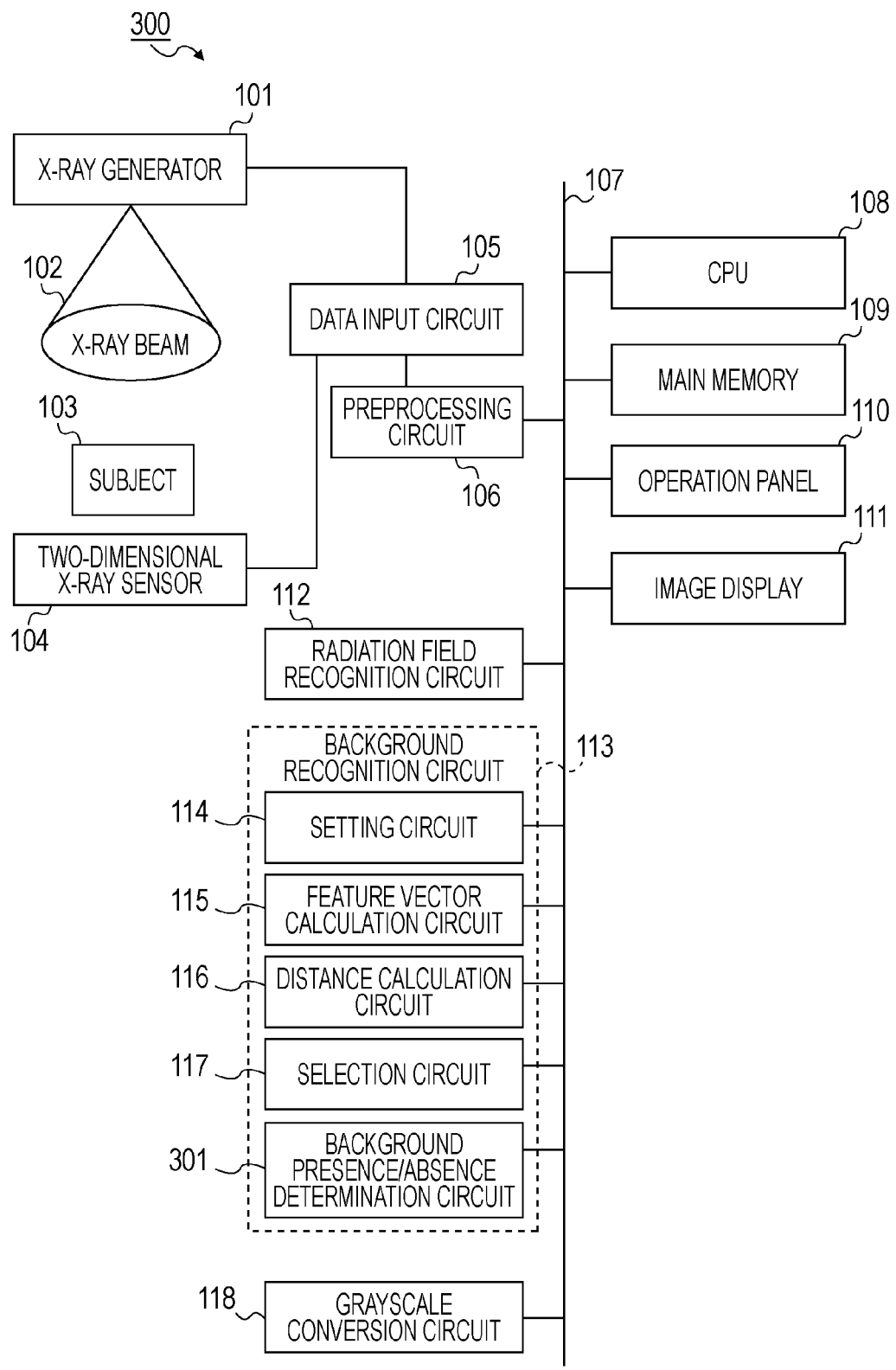
FIG. 3 is a diagram illustrating a configuration of an image processing apparatus according to an embodiment of the present invention.

In the image processing apparatus 100, the data input circuit 105 and the preprocessing circuit 106, are connected to each other. The -data input circuit 105 is also connected to a two-dimensional radiation sensor (hereinafter also referred to simply as the sensor) 104 and a radiation generator 101. The background recognition circuit 113 includes a setting circuit 114, a feature vector calculation circuit 115, a distance calculation circuit 116, and a selection circuit 117. These parts are connected to the CPU bus 107. Note that an X-ray is a specific example of radiation, and X-ray generators in FIGS. 1 and 3 are specific examples of the radiation generator 101. Similarly, two-dimensional X-ray sensors shown in FIGS. 1 and 3 are specific examples of the two-dimensional radiation sensor 104.

In this image processing apparatus 100, the main memory 109 is used to store various kinds of data necessary in processing performed by the CPU 108. The main memory 109 also functions as a working memory of the CPU 108. Using the main memory 109, the CPU 108 controls operations of the apparatus in accordance with an operation performed by a user on the operation panel 110. More specifically, the image processing apparatus 100 operates as follows.

If an image capture command is input by a user via the operation panel 110, the image capture command is transferred by the CPU 108 to the data input circuit 105. In accordance with the image capture command, the CPU 108 controls the radiation generator 101 and the two-dimensional radiation sensor 104 so as to capture a radiation image.

In the capturing of the radiation image, first, the radiation generator 101 emits a radiation beam 102 toward a subject 103. The radiation beam 102 emitted from the radiation generator 101 passes through the subject 103 while attenuating, and reaches a light receiving surface of the two-dimensional radiation sensor 104. In response, the two-dimensional radiation sensor 104 outputs a radiation image signal. In the present embodiment, it is assumed that the subject 103 is a human body. In this case, the radiation image output from the two-dimensional radiation sensor 104 is a human body image. Instead of using the two-dimensional radiation sensor 104, an imaging plate may be used. In this case, a latent image formed on the imaging plate is excited so as to convert the latent image into a digital signal thereby obtaining radiation image data.

The data input circuit 105 converts the radiation image signal output from the two-dimensional radiation sensor 104 into a digital signal and supplies the resultant digital signal as radiation image data to the preprocessing circuit 106. The preprocessing circuit 106 performs a preprocess, such as an offset correction process, a gain correction process, etc., on the signal (the radiation image data) supplied from the data input circuit 105. As a result of the preprocess performed by the preprocessing circuit 106 on the radiation image data, original image data is obtained and supplied to the main memory 109 via the CPU bus 107 and stored therein under the control of the CPU 108. The original image data is also supplied to the radiation field recognition circuit 112.

The radiation field recognition circuit 112 recognizes a radiation field of the original image data supplied via the CPU bus 107. Note that the radiation field refers to an area to which the radiation is limited so as to minimize scattering of radiation from an area that is not necessary to be exposed to the radiation thereby preventing a reduction in contrast. The limiting of the radiation to the necessary area is called "radiation field narrowing". An image of the radiation field produced by the radiation field recognition circuit 112 is supplied to the background recognition circuit 113 via the CPU bus 107 under the control of the CPU 108.

The background recognition circuit 113 is a circuit configured to recognize a background area from the original image data. As shown in FIG. 1, the background recognition circuit 113 includes the setting circuit 114 for extracting at least two or more pixel values from the original image data. The feature vector calculation circuit 115 serves as a calculation unit configured to calculate a feature vector from the plurality of pixel values extracted by the setting circuit 114. The feature vector includes at least two or more components of feature values selected from the followings: the standard deviation of pixel values greater than a selected particular value, the variance of such pixel values, the skewness of such pixel values, the kurtosis of such pixel values, and the difference between the average and the selected particular value.

The main memory 109 serves as a storage unit configured to store a feature value of a template. Note that the feature value of the template refers to a feature value corresponding to a pixel value indicating a boundary between the subject area and the background area directly exposed to the radiation.

In the background recognition circuit 113, the distance calculation circuit 116 serves as a distance calculation unit configured to combine the feature values calculated by the feature vector calculation circuit 115 into a multidimensional feature vector (hereinafter also referred to simply as a feature value) and calculate the distance thereof from the feature value of the template. The selection circuit 117 serves as a selection unit configured to select a pixel value for which the distance calculated by the distance calculation circuit 116 has a minimum value. The selected pixel value is used as a pixel value at which the background area and the subject area are divided from each other.

The units described above are connected to the CPU bus 107. Information associated with the radiation field and the background area recognized by the radiation field recognition circuit 112 and the background recognition circuit 113 is supplied to the grayscale conversion circuit 118 via the CPU bus 107. In accordance with the supplied information, the grayscale conversion circuit 118 performs a gray-level conversion on the original image data. More specifically, in the grayscale conversion circuit 118, the gray-level conversion is performed on the original image according to a gray-level conversion curve such that pixel values in the subject area taken based on the recognized background area are converted to proper values. The gray-level conversion curve used in the gray level conversion process may be represented by a lookup table.

The operation of the background recognition circuit 113 in the image processing apparatus 100 according to the present embodiment is described below with reference to a flow chart shown in FIG. 2.

First, the original image produced by the preprocessing circuit 106 is transferred, via the CPU bus 107, to the radiation field recognition circuit 112 located at a stage before the background recognition circuit 113. The background recognition circuit 113 recognizes the radiation field. The recognition of the radiation field may be performed, for example, using a method proposed in an invention filed by the present applicant and granted as Japanese Granted Patent Publication No. 03631095. In this technique, the likelihood of being a radiation field edge is represented by a score calculated based on a pattern of a pixel of interest and adjacent pixels, and a radiation field is recognized based on the score.

The original image supplied to the radiation field recognition circuit 112 does not necessarily need to be of a full size, but an image reduced by an arbitrary factor may be supplied as the original image.

Figure 6:
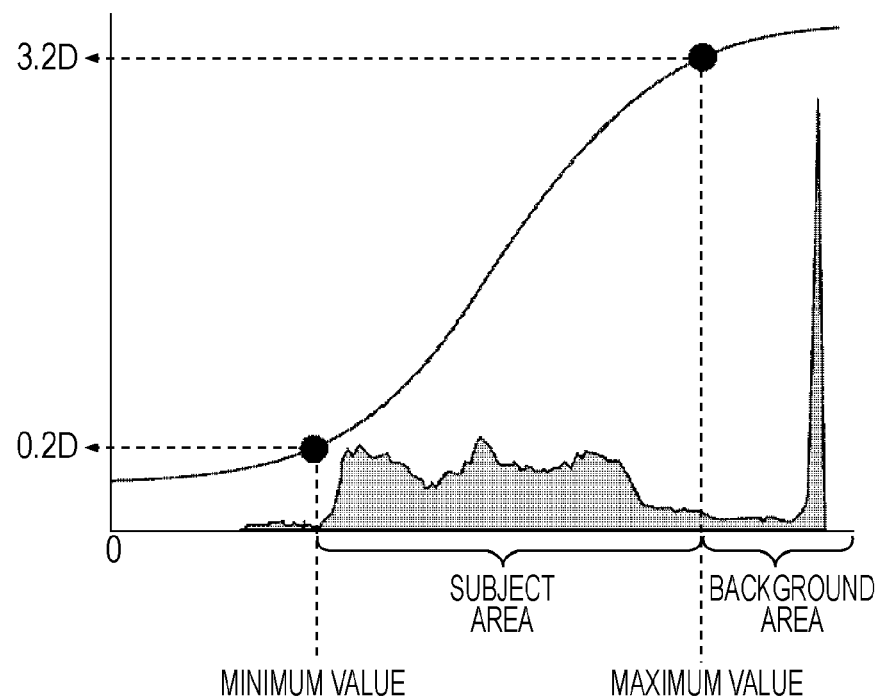
FIG. 6 is a diagram provided for explanation of a gray-level conversion.

The background recognition circuit 113 then determines, as a representative value, the pixel value indicating the value of the boundary between the subject area and the background area that is an area directly exposed to the radiation. FIG. 6 illustrates an example of a histogram of pixel values of an input image. As can be seen in FIG. 6, in the background area, no great attenuation of the radiation intensity occurs, and the pixel values therein are greater than those in the subject area and have a sharp peak. On the other hand, in the subject area, the shape of the histogram changes greatly depending on the physique or the part of the body whose image is captured. In contrast, the histogram of the background area does not change greatly depending on such factors. Therefore, if the threshold value is determined based on the characteristic of a range corresponding to the background area in which the histogram does not have a great change in shape, it becomes possible to accurately recognize the background area.

In step S201, in the background recognition circuit 113, the setting circuit 114 selects arbitrary N pixel values from the original image data. In order to calculate a feature value on the assumption that a background area is given by an area in which pixel values are greater than a particular pixel value determined later, one of the N pixels should be a pixel at which the pixels are divided into the subject area and the background area. To meet the above requirement, all pixels of the original image data in a range from a minimum value to a maximum value may be selected. However, the selection of pixels does not necessarily need to be performed in this manner, but an arbitrary number of pixels may be selected from the total number of pixels of the original image data in the range from the minimum value to the maximum value. Because the background area has great pixel values, an arbitrary number of pixels may be selected from a range from the average to the maximum value of the original image data.

Next, the feature vector calculation circuit 115 calculates an N-dimensional feature vector of feature values representing a feature of a pixel for each of the pixels selected by the setting circuit 114.

More specifically, in step S202, 1 is set as an initial value to an index i of the selected pixels. In step S203, a pixel data series $\{x_j | j=1, \ldots, M\}$ of pixels having a value greater than or equal to the pixel value Vi corresponding to the index i is extracted from the original image data. The pixel data series refers to a subset of pixel values of the original image data where the pixel values are equal to or greater than the pixel value Vi. The original image data refers to a series of pixel values constituting the original image. The radiation image data refers to a series of pixel values constituting the radiation image.

In step S204, a feature vector Ai of feature values is calculated from the extracted pixel data series. In the present embodiment, the feature values including the standard deviation $a_1$, the skewness $a_2$, the kurtosis $a_3$, and the difference $a_4$ between the average and the selected pixel value are calculated, and these feature values are represented in the form of a 4-dimensional feature vector $Ai=[a_1, a_2, a_3, a_4]^T$.

The standard deviation $a_1$ represents the degree of scattering of the distribution and is calculated according to equation (1) shown below.

$$a_1 = \sigma = \sqrt{\frac{1}{M}\sum_{j=1}^{M}(x_j - \bar{x})^2} \quad (1)$$

$$\bar{x} = \frac{1}{M}\sum_{j=1}^{M} x_j$$

In equation (1), the greater $a_1$ the greater the scattering of the distribution.

The skewness $a_2$ indicates a direction in which the distribution is shifted to an asymmetrical form from a symmetric distribution and indicates the degree of the asymmetry. The skewness $a_2$ is calculated according to equation (2) shown below.

$$a_2 = \frac{1}{M\sigma^3}\sum_{j=1}^{M}(x_j - \bar{x})^3 \quad (2)$$

When the distribution has a longer tail on the right side, $a_2>0$, while $a_2<0$ when the distribution has a longer tail on the left side. The greater the absolute value of $a_2$, the greater the tail.

The kurtosis $a_3$ indicates the degree of sharpness and is calculated according to equation (3) shown below.

$$a_3 = \frac{1}{M\sigma^4}\sum_{j=1}^{M}(x_j - \bar{x})^4 \quad (3)$$

When the distribution is sharper than the normal distribution, $a_3>3$, while $a_3<3$ when the distribution is flatter than the normal distribution.

The difference $a_4$ between the average and the selected pixel value represents the distance from the barycenter (the arithmetical mean) of the distribution to the pixel value Vi, and is calculated according to equation (4) shown below.

$$a_4 = \bar{x} - V_i \quad (4)$$

In equation (4), the greater $a_4$, the greater the tail on the left side.

In the present embodiment, the feature vector Ai is given by a 4-dimensional vector including four components indicating feature values. Alternatively, the feature vector may be given by a 2-dimensional vector, for example, of the skewness and the kurtosis. Conversely, the feature vector may be given by a higher-order vector including a greater number of feature values. Thus, the feature vector Ai is obtained via the calculation described above.

In a case where the determination in step S205 whether i>N−1 is false, that is, in a case where the calculation of the feature vector Ai is not completed for all pixel values Vi, then in step S206, the index i is incremented. Thereafter, the above-described steps S203 and S204 are repeated for a new pixel value Vi. In this way, the feature vector Ai is calculated for each of all pixel values Vi.

Next, in the distance calculation circuit 116, the distance between the feature vector calculated by the feature vector calculation circuit 115 and the average vector that is a feature value of a template for a case in which the background area is correctly separated is calculated in a feature space. In the present embodiment, the distance is defined by a Mahalanobis' generalized distance taking into account the variance or the correlation of the average vector. Note that the distance does not necessary need to be given by the Mahalanobis' generalized distance, but the distance may be defined by other distance measure. Note that when there are N feature values, the feature space is of N dimensions.

As for the distance measure in the feature space, for example, a Euclidean distance, a normalized Euclidean distance, a city-block distance, or a Mahalanobis' generalized distance may be used. That is, a distance measure used in a pattern recognition technique may be used.

The distance between the feature value determined for each pixel value series and the feature value of the template in the feature space is calculated. If the calculated distance has a small value, the extracted pixel value series is close to the pixel value series used to obtain the feature value of the template. Conversely, when the calculated distance has a large value, the extracted pixel-value series is far from the pixel value series used to obtain the feature value of the template. When the distance is greater than a particular value, there is a high statistical probability that there is no background area.

In step S207, the distance calculation circuit 116 acquires, from the main memory 109, information associated with the feature values for a case in which the background area is correctly separated. More specifically, the distance calculation circuit 116 reads an average vector U and a variance-covariance matrix $\Sigma$ of the average vector U from the main memory 109. The average vector U and the variance-covariance matrix $\Sigma$ are given by following equations.

$$U = [\mu_1, \mu_2, \mu_3, \mu_4]^T \quad (5)$$

$$\sum = \begin{bmatrix} \sigma_{11} & \sigma_{12} & \sigma_{13} & \sigma_{14} \\ \sigma_{21} & \sigma_{22} & \sigma_{23} & \sigma_{24} \\ \sigma_{31} & \sigma_{32} & \sigma_{33} & \sigma_{34} \\ \sigma_{41} & \sigma_{42} & \sigma_{43} & \sigma_{44} \end{bmatrix}$$

where $\mu_1$, $\mu_2$, $\mu_3$, and $\mu_4$ are population means of the feature values (the standard deviation, the skewness, the kurtosis, and the difference between the average and the selected pixel value) for the case where the background area is correctly separated, and $\sigma_{ij}$ is the covariance between the two feature values.

The information associated with the feature values represented by equation (5) is calculated in advance and stored in the main memory 109 serving as a storage unit. One method of obtaining the information in advance is to prepare N images as training data, and set, by visual observation, a pixel value at which a subject area and a background area are separated from each other for each of the N images. A feature vector of an area greater than the boundary pixel value is calculated in the manner described above for each of the N images, and thus a total of N samples $\{X_k | k=1, \ldots, N\}$ are produced. Using these samples, the sample mean and the unbiased variance are determined according to equation (6) shown below, and the resultant values are employed as $\mu_i$ and $\sigma_{ij}$.

$$X_k = [x_{1,k}, x_{2,k}, x_{3,k}, x_{4,k}]^T \quad (6)$$

$$\mu_i \leftarrow \bar{x}_i = \frac{1}{n} \sum_{k=1}^{N} x_{i,k}$$

$$\sigma_{i,j} \leftarrow s_{i,j} = \frac{1}{n-1} \sum_{k=1}^{N} (x_{i,k} - \bar{x}_i)(x_{j,k} - \bar{x}_j)$$

The information associated with the feature values is not limited to one piece of information, but a plurality of pieces of information may be prepared depending on the patient information (age, sex, height, weight, etc.), the image capture conditions (image capture distance, tube voltage, tube current, irradiation time, etc.), the part (breast, head, etc.) of the body whose image is captured, etc. That is, the feature values may be prepared for each of one or more parameters/conditions such as the patient information, the image capture conditions, and the part of the body. In step S208, the index i indicating the currently selected pixel value is set to an initial value of 1.

In step S209, the Mahalanobis' generalized distance $D^2_i$ between the feature vector Ai corresponding to the index i and the average vector U is calculated from the original image data according to equation (7) shown below.

$$D_i^2 = (A_i - U)^T \Sigma^{-1} (A_i - U) \quad (7)$$

The Mahalanobis' generalized distances $D^2_i$ calculated from the 4-dimensional feature vectors have values according to a chi-square distribution with a degree of freedom of 4, and thus, on the basis of the Mahalanobis' generalized distance, it is possible to determine the probability that the feature vector Ai belongs a group (represented by the average vector U and the variance-covariance matrix $\Sigma$). That is, by calculating the Mahalanobis' generalized distance $D^2_i$, it is possible to determine the probability that an area equal to or greater than the pixel value Vi is a background area. For example, when $D^2_i \leq 3.35699$, the probability of being a background area is 50%. When $D^2_i \leq 1.06362$, the probability of being a background area is 90%. That is, the smaller the distance, the greater the probability of being a background area.

Next, in step S210, after the calculation of the Mahalanobis' generalized distance $D^2_i$, a determination is made whether i>N−1 is false, that is, whether the Mahalanobis' generalized distance $D^2_i$ is not determined for all feature vectors Ai. In step S211, the index i is incremented. Thereafter, the processing flow returns to step S209 to determine the Mahalanobis' generalized distance $D^2_i$ for a new feature vector Ai. This process is performed repeatedly until the Mahalanobis' generalized distance $D^2_i$ is determined for all new feature vectors Ai.

Next, the selection circuit 117 selects, as a representative value, a pixel value for which the distance calculated by the distance calculation circuit 116 has a minimum value. The selected pixel value indicates a value at which the background area and the subject area are separated from each other. More specifically, in step S212, the index i indicating the currently selected pixel value is set to an initial value of 1, and an initial value of 1 is set in a variable ind indicating the index pointing to the pixel value for which the Mahalanobis' generalized distance has a minimum value. In step S213, $D^2_{ind}$ is compared with $D^2_{i+1}$. If $D^2_{ind} < D^2_{i+1}$ is false, that is, if $D^2_{ind}$ is not the smallest, then in step S214, i+1 is set to ind. In step S215, the index i is incremented. If the determination in step S216 whether i>N−1 is false, that is, if the comparison is not yet completed, steps S213 to S215 are repeated. If the comparison is completed, ind has a value indicating the index of the pixel value for which the Mahalanobis' generalized distance has a minimum value. In step S217, a pixel value Vind corresponding to the above-described value of the index is set to a threshold value TH.

Figure 7:
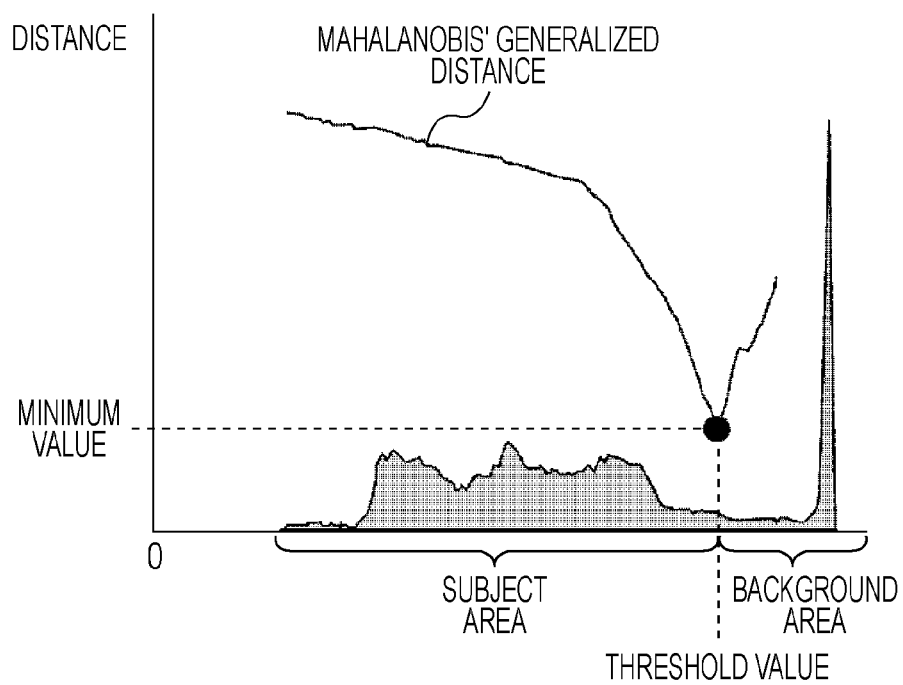
FIG. 7 is a diagram provided for explanation of a background recognition method.

As can be seen from FIG. 7, an area above the pixel value for which the Mahalanobis' generalized distance has the minimum value is most likely to be a background area, and this pixel value is an optimum pixel value (also called a representative value or a threshold value) at which to separate the background area.

After the optimum threshold value is determined by the background recognition circuit 113 in the above-described manner, the grayscale conversion circuit 118 performs the gray level conversion according to the information associated with the radiation field and the background area recognized by the radiation field recognition circuit 112 and the background recognition circuit 113.

There is no particular restriction on the method of the gray level conversion, as long as a range from the minimum value of the radiation field recognized by the radiation field recognition circuit 112 to the threshold value TH calculated by the background recognition circuit 113 is employed as the subject area. The gray level conversion is performed such that the gray levels of the subject area fall within the range from the minimum level 0.2 D to the maximum level 3.2 D.

In the present embodiment, the feature vector indicating the feature of the background area is calculated, and the distance between this feature vector and the average vector is calculated for the case where the background area is correctly separated. This makes it possible to accurately determine the threshold value at which the subject area and the background area are separated from each other.

Second Exemplary Embodiment

Figure 4:
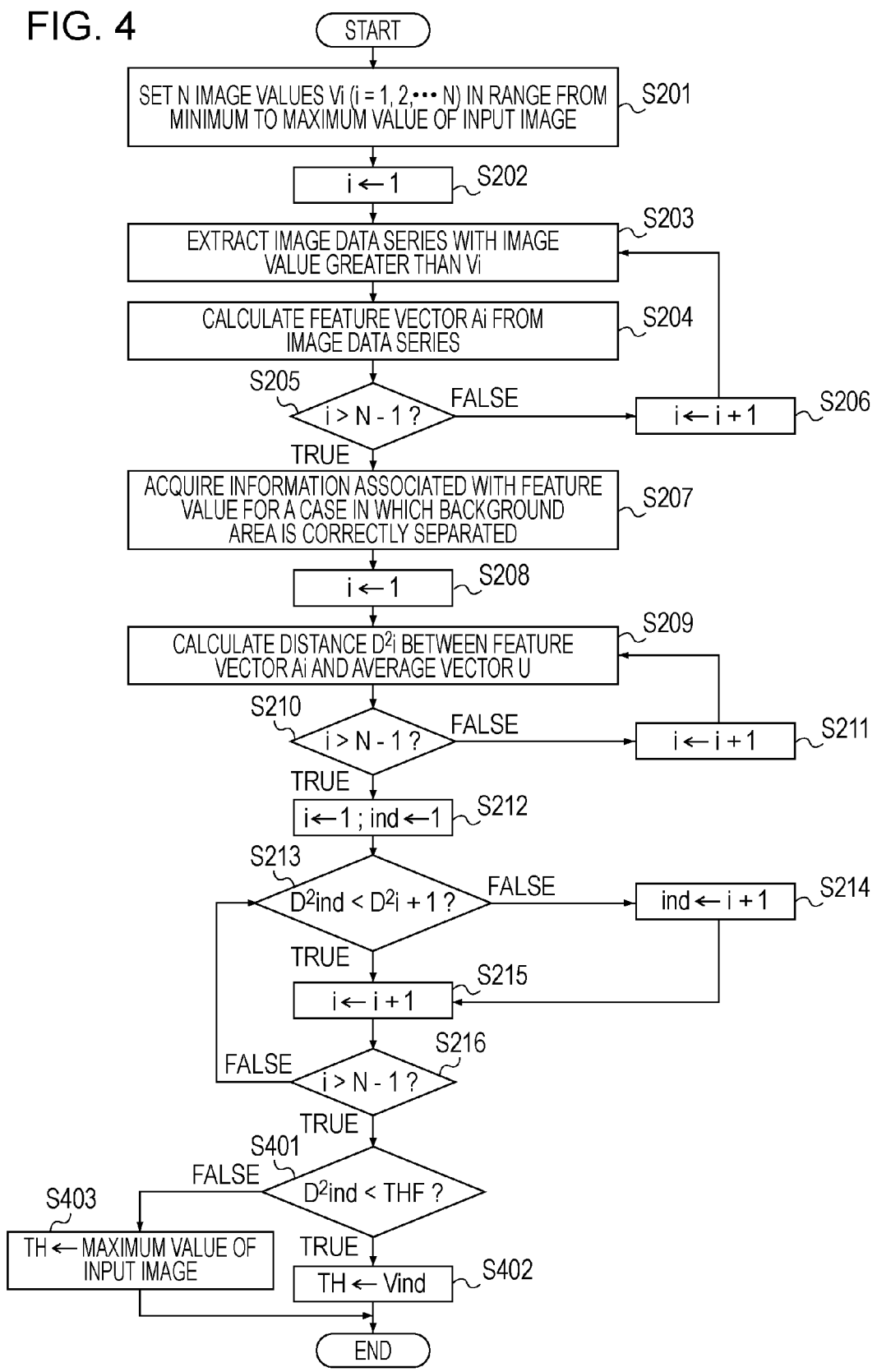
FIG. 4 is a flow chart illustrating a process performed by a background recognition circuit according to an embodiment of the present invention.

FIG. 3 is a diagram illustrating an image processing apparatus configured to have functions according to a second exemplary embodiment of the present invention. FIG. 4 is a flow chart illustrating a process performed by the background recognition circuit according to the second exemplary embodiment of the invention.

First, referring to FIG. 3, the configuration of the image processing apparatus 300 according to the present embodiment is described below. The image processing apparatus 300 is similar to the image processing apparatus 100 except that the image processing apparatus 300 additionally includes a background presence/absence determination circuit 301.

In FIG. 3, similar parts to those of the image processing apparatus 100 are denoted by similar reference numerals, and a further detailed description thereof is omitted herein. In the flow chart shown n FIG. 4, similar steps to those in the flow chart shown in FIG. 2 are denoted using similar step numbers.

First, the background recognition circuit 113 performs steps S201 to S216 in a similar manner as described above to determine the index ind of the pixel value for which the Mahalanobis' generalized distance has a minimum value. In a case where the original image data includes no background area, a pixel value for which the Mahalanobis' generalized distance has a minimum value does not provide an optimum threshold value at which a background area is to be separated. Therefore, the background presence/absence determination circuit 301 determines whether the original image data has a background area. If the original image data has no background area, a maximum value of the original image data is output as the threshold value TH. In step S401 the background presence/absence determination circuit 301 compares $D^2_{ind}$ with an arbitrarily set threshold value THF. If the determination whether $D^2_{ind} < THF$ is true, that is, if the probability of being a background area is high, then in step S402, it is determined that the original image data has a background area, and Vind is substituted into TH.

If the determination whether $D^2_{ind} < THF$ is false, that is, if the probability of being a background area is low, then in step S403, it is determined that the original image data has no background area, and the maximum value of the original image data is substituted into TH. There is no particular restriction on the method of determining the threshold value THF. For example, the threshold value THF is set to 1.06362 for which the probability of being a background area is 90%.

In the present embodiment, the determination by the background presence/absence determination circuit 301 whether there is a background area makes it possible to properly determine the threshold value at which the subject area and the background area are separated from each other even in a case where the original image data includes no background area.

Third Exemplary Embodiment

Figure 5:
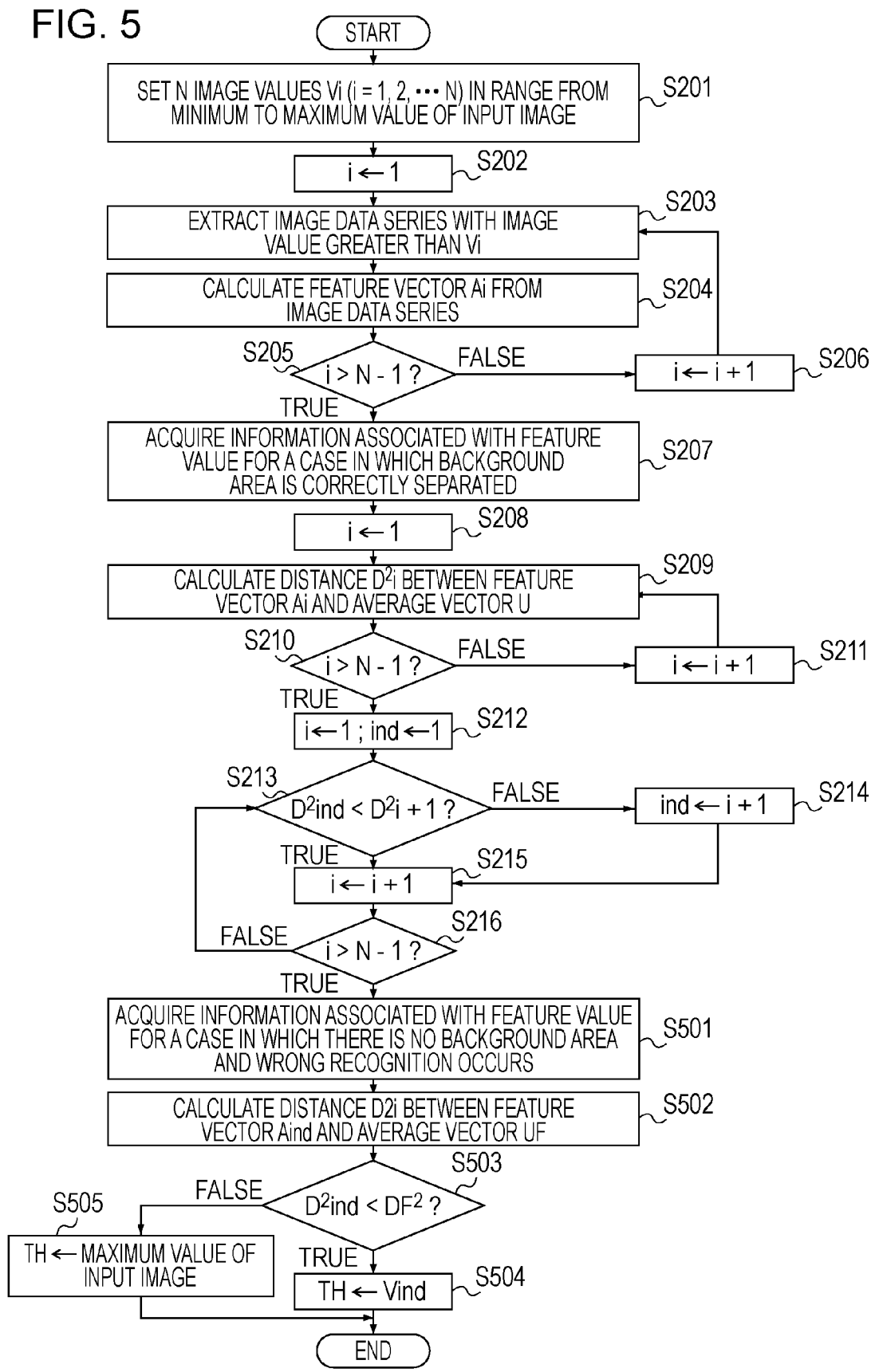
FIG. 5 is a flow chart illustrating a process performed by a background recognition circuit according to an embodiment of the present invention.

FIG. 5 is a flow chart illustrating a process performed by the background recognition circuit according to a third exemplary embodiment of the invention.

In the third embodiment, the background recognition circuit 113 in the image processing apparatus 300 shown in FIG. 3 operates according to the flow chart shown in FIG. 5. In the flow chart shown in FIG. 5, steps similar to those in the flow chart shown in FIG. 4 are denoted by similar step numbers.

First, the background recognition circuit 113 performs steps S201 to S216 in a similar manner as described above to determine the index ind of the pixel value for which the Mahalanobis' generalized distance has a minimum value.

In step S501, the background presence/absence determination circuit 301 acquires, from the main memory 109, information associated with the feature values for a case in which a background area is incorrectly recognized although there is actually no background area. More specifically, the distance calculation circuit 116 reads an average vector UF and a variance-covariance matrix $\Sigma$ of the average vector UF from the main memory 109.

Like in step S207, the information associated with the feature values is calculated in advance and stored in the main memory 109. One method of obtaining the information in advance is to prepare N images including no background area as training data, and an incorrectly recognized threshold value TH is calculated for each of the N images by performing a process similar to the first embodiment described above. A feature vector of an area above the threshold value TH is calculated in the manner described above for each of the N images, and thus a total of N samples $\{X_k | k=1, \ldots, N\}$ are produced. Using these samples, the average vector UF and the variance-covariance matrix $\Sigma$ of the average vector UF are calculated according to equation (6).

The information associated with the feature values is not limited to one piece of information, but a plurality of pieces of information may be prepared depending on the patient information (age, sex, height, weight, etc.), the image capture conditions (image capture distance, tube voltage, tube current, irradiation time, etc.), the part (breast, head, etc.) of the body whose image is captured, etc. In step S502, the Mahalanobis' generalized distance $DF^2$ between the feature vector Ai and the average vector UF is calculated in a similar manner to step S209.

In step S503, $D^2_{ind}$ is compared with $DF^2$. If the determination whether $D^2_{ind}<DF^2$ is true, that is, if the probability of being a background area is higher than the probability that a background area is incorrectly recognized, then in step S504, it is determined that the original image data has a background area, and Vind is substituted into TH. If the determination whether $D^2_{ind}<DF^2$ is false, that is, if the probability of being a background area is lower than the probability that a background area is incorrectly recognized, then in step S505, it is determined that the original image data has no background area, and the maximum value of the original image data is substituted into TH.

In the present embodiment, the determination by the background presence/absence determination circuit 301 whether there is a background area makes it possible to properly determine the threshold value at which the subject area and the background area are separated from each other even in a case where the original image data includes no background area.

As described above with reference to the exemplary embodiments, the present invention makes it possible to correctly discriminate a subject area of a radiation image from a background area where radiation directly hits the sensor surface.

Note that the present invention can be applied to an apparatus comprising a single device or to a system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code.

In this case, so long as the system or apparatus has the functions of the program, the mode of implementation need not rely upon a program.

Accordingly, since the functions of the present invention are implemented by computer, the program code installed in the computer also implements the present invention. In other words, a computer program for the purpose of implementing any one or more functions according to any one or any combination of embodiments falls within the scope of the present invention. In this case, so long as the system or apparatus has the functions of the program, the program may be executed in any form, such as an object code, a program executed by an interpreter, or scrip data supplied to an operating system. Examples of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer may be connected to a website on the Internet using a browser of the client computer, and the computer program of the present invention or an automatically-installable compressed file of the program may be downloaded to a storage medium such as a hard disk.

Further, the program of the present invention may be supplied by dividing the program code constituting the program into a plurality of files and downloading the files from different websites.

In other words, a WWW (World Wide Web) server that provides, to multiple users, the program files that implement the functions of the present invention by computer also falls within the present invention.

The program of the present invention may be stored in an encrypted form on a storage medium such as a CD-ROM, and the storage medium may be distributed to users. Users who meet certain requirements are allowed to download decryption key information from a website via the Internet whereby these users are allowed to decrypt the encrypted program by using the key information and install the program in a user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, the program may be read from the storage medium and loaded to a function expansion board inserted into the computer or to a memory disposed in a function expansion unit connected to the computer, and a CPU or the like mounted on the function expansion board or function expansion unit may perform all or a part of the actual processing so that the functions of the foregoing embodiments are implemented by this processing.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Application No. 2007-296846 filed Nov. 15, 2007, which is hereby incorporated by reference herein in its entirety.

What is claimed is:

1. An image processing apparatus configured to obtain a pixel value indicating a value of a boundary between a subject area and a background area of an image, the subject area being an area formed by radiation passing through a subject, the background area being an area directly exposed to the radiation, comprising:
   a storage unit configured to obtain, from the image, a feature value corresponding to the pixel value indicating the boundary between the subject area and the background area directly exposed to the radiation and store the obtained feature value as a template;
   a calculation unit configured to calculate a feature value corresponding to each of a plurality of pixel values from the image;
   a distance calculation unit configured to calculate a distance in a feature space between the feature value of the template and each of the feature values calculated by the calculation unit; and
   a selection unit configured to select a pixel value corresponding to a feature value with a smallest distance calculated by the distance calculation unit, the selected pixel value indicating the boundary between the subject area and the background area in the image.

2. The image processing apparatus according to claim 1, further comprising an acquisition unit configured to acquire information associated with at least one of patient information of the image, an image capture condition, or an image-captured part of a body, wherein the feature value of the template is determined and stored in the storage unit for each of at least one or more items of the patient information, the image capture condition, or the image-captured part of the body, and a feature value of a template used by the distance calculation unit is selected depending on the information associated with at least one of the items of the patient information, the image capture condition, or the image-captured part of the body.

3. The image processing apparatus according to claim 2, wherein the feature value calculated by the calculation unit is determined based on the information associated with at least one of the items of the patient information, the image capture condition, or the image-captured part of the body.

4. The image processing apparatus according to claim 1, wherein the feature values calculated by the calculation unit include at least two or more of a feature value indicating a standard deviation of pixel values greater than or equal to a selected pixel value of the original image, a feature value indicating a variance of such pixel values, a feature value indicating a skewness determined for such pixel values, a feature value indicating a kurtosis determined for such pixel values, and a feature value indicating a difference between the average of such pixel values and the selected pixel value.

5. The image processing apparatus according to claim 1, wherein an Euclidean distance, a normalized Euclidean distance, a city-block distance, or a Mahalanobis' generalized distance is used as a distance measure when calculating distances.

6. The image processing apparatus according to claim 1, further comprising a background presence/absence determination unit configured to determine a presence/absence of a background area such that when distances calculated by the distance calculation unit are greater than a predetermined value, it is determined that there is no background area.

7. A method for processing images, the method comprising:

reading, as a template, a feature value of an image including a boundary between a subject area and a background area directly exposed to radiation;

calculating a feature value corresponding to each of a plurality of pixel values for the image;

calculating a distance in a feature space between each calculated feature value and the template; and selecting a pixel value corresponding to a feature value with a smallest calculated distance, the selected pixel value indicating the boundary between the subject area and the background area in the image.

8. A non-transitory storage medium storing a computer program, the computer program causing a computer to:

read, as a template, a feature value of an image including a boundary between a subject area and a background area directly exposed to radiation;

calculate a feature value corresponding to each of a plurality of pixel values for the image;

calculate a distance in a feature space between each calculated feature value and the template;

select a pixel value corresponding to a feature value with a smallest calculated distance, the selected pixel value indicating the boundary between the subject area and the background area in the image.

* * * * *